United States Patent [19]

McManus

[11] Patent Number: 5,584,114
[45] Date of Patent: Dec. 17, 1996

[54] METHOD OF MAKING MOLDED RESIN MOTOR HOUSING

[75] Inventor: Edward C. McManus, Rochester, N.Y.

[73] Assignee: Webster Plastics, Webster, N.Y.

[21] Appl. No.: 392,862

[22] PCT Filed: Sep. 9, 1993

[86] PCT No.: PCT/US93/08542

§ 371 Date: Mar. 2, 1995

§ 102(e) Date: Mar. 2, 1995

[87] PCT Pub. No.: WO94/06195

PCT Pub. Date: Mar. 17, 1994

[51] Int. Cl.⁶ ..................................... H02K 15/14
[52] U.S. Cl. ........................... 29/596; 29/525; 264/272.2
[58] Field of Search .................. 29/596, 898.07, 29/525; 264/271.1, 272.11, 272.15, 272.19, 272.2; 310/42, 43, 89, 152

[56] References Cited

U.S. PATENT DOCUMENTS

| | | |
|---|---|---|
| 3,444,402 | 5/1969 | Cartier . |
| 3,789,250 | 1/1974 | Maciot et al. . |
| 3,932,929 | 1/1976 | Hallerback et al. . |
| 4,004,167 | 1/1977 | Meckling . |
| 4,173,822 | 11/1979 | Futterer et al. ........................... 29/596 |
| 4,412,146 | 10/1983 | Futterer et al. . |
| 4,414,481 | 11/1983 | deJong . |
| 4,508,988 | 4/1985 | Reiss et al. . |
| 4,572,979 | 2/1986 | Haar et al. . |
| 4,573,258 | 3/1986 | Io et al. .................................... 29/596 |
| 4,593,222 | 6/1986 | Burkel et al. . |
| 4,726,113 | 2/1988 | Shibata et al. ................... 264/272.2 X |
| 4,862,582 | 9/1989 | Henck ...................................... 29/596 |
| 4,910,861 | 3/1990 | Dohogne . |
| 4,931,681 | 6/1990 | Spaggiari . |
| 4,954,736 | 9/1990 | Kawamoto et al. . |
| 4,982,125 | 1/1991 | Shirakawa . |
| 5,015,155 | 5/1991 | Brown . |
| 5,038,460 | 8/1991 | Ide et al. .......................... 264/272.2 X |
| 5,073,738 | 12/1991 | Tang . |
| 5,121,021 | 6/1992 | Ward . |
| 5,201,111 | 4/1993 | Prohaska . |
| 5,232,652 | 8/1993 | Bianco ............................. 264/272.2 X |
| 5,268,607 | 12/1993 | McManus . |
| 5,334,897 | 8/1994 | Ineson et al. ............................. 310/89 |

Primary Examiner—S. Thomas Hughes
Attorney, Agent, or Firm—Eugene Stephens & Associates

[57] ABSTRACT

An electric motor housing assembly (10) for electromechanical drives in automobiles is injection molded from a resin material. An armature bearing (18), mounting holes (30), and a flux ring (38) are molded in place within a housing (12) so that inner cylindrical surfaces (20 and 40) of the armature bearing and flux ring are centered with respect to the mounting holes (30) along a central axis (34). Protrusions (52 and 52) are molded through openings in the flux ring (38) for holding permanent magnets (44 and 46) in place against the flux ring.

16 Claims, 5 Drawing Sheets

METHOD OF MAKING MOLDED RESIN MOTOR HOUSING

RELATED APPLICATIONS

This application is a Division of U.S. application Ser. No. 07/942,434, filed on 9 Sep. 1992, now U.S. Pat. No. 5,268,607, reentering the United States through corresponding International Application No. PCT/US93/08542, filed on 9 Sep. 1993.

TECHNICAL FIELD

My invention relates to small electric motors having cup-shaped housings and, in particular, to direct current (DC) motors with permanent magnets and of the type used to power auxiliary systems in automobiles.

BACKGROUND OF INVENTION

Small electric motors are used for many purposes in automobiles. For example, a fully equipped automobile includes individual motors for powering each windshield wiper system, fan, and window lift system and three additional motors for powering each adjustable seat. Electric motors are also used as sunroof, mirror, and antenna drives.

Ordinarily, these motors have metal housings that are formed from drawn steel cans. C-shaped permanent magnets are attached to the sides of the can with adhesives, clips, or screws that are tapped into the magnets. The steel body of the can functions as a flux ring surrounding the magnets. A self-centering bearing is mounted at a closed end of the can. One end of an armature shaft is journaled in the bearing, and the armature shaft can be tilted with the bearing into alignment with another bearing carried in a housing cover.

The drawn steel cans are expensive and add considerable weight to the motors. The self-centering bearings, which are mounted on their outside diameter surfaces, require additional clearance between the armature and the permanent magnets to align the armature shaft between the bearings. The additional clearance detracts from motor performance.

An electric motor having a molded resin housing is disclosed in U.S. Pat. No. 4,412,146 to Futterer et al. A flux return element consisting of two cylindrical half shells is embedded in the periphery of the molded housing and a permanent magnet is embedded about an injection molded element within a central aperture of the housing. A bell-shaped rotor includes a cylindrical winding that rotates between the flux return element and the permanent magnet. Bearing seats for mounting rotor bearings are molded in opposite ends of the injection molded element.

Similar to conventional metal housings, the molded resin housing of Futterer et al. provides for mounting the rotor bearings about their outer diametral surfaces. The bearing seat at the closed end of the housing also forms a separate cavity from the cavity within which the flux return element and magnets are embedded. Accordingly, the design does not allow for the inner diameters of the rotor bearings and flux return element to be accurately aligned to a central axis to optimize motor performance.

SUMMARY OF INVENTION

My new electric motor housing assembly overcomes problems with prior drawn steel housings by replacing the steel housings with resin housings and feromagnetic flux rings. The resin material weighs much less than the steel and can be more easily formed to a desired shape. The flux rings are also much easier to form. Problems with the prior molded resin housings are also overcome by improving the alignment and mounting arrangement of motor components within the housing.

One example of my motor housing assembly includes a cup-shaped housing that is injection molded from a resin material. A flux ring is molded in place within a center portion of the housing; an armature bearing is molded in place within a closed end of the housing; and alignment elements for mounting a housing cover are molded in place within an open end of the housing. Also, protrusions are molded through openings in the flux ring for securing the flux ring to the housing and for holding permanent magnets in place against the flux ring.

Inner cylindrical surfaces of both the flux ring and the armature bearing are centered within the housing with respect to the alignment elements in positions defined by different portions of a single mold core. This helps to reduce run-out of a motor armature and assures a precise positional relationship between the armature and the magnets. Motor performance is improved by reducing an amount of clearance space between the armature and the magnets.

Openings in the exterior of the housing expose the flux ring to atmosphere for dissipating heat. The openings are formed by projections on two mold slides that compress the flux ring against the mold core part. The compressing action of the two mold slides conforms the flux ring to the mold core part to provide a stop for limiting the flow of resin and to shape the flux ring for accurately mounting the magnets.

DRAWINGS

DETAILED DESCRIPTION

Figure 1:
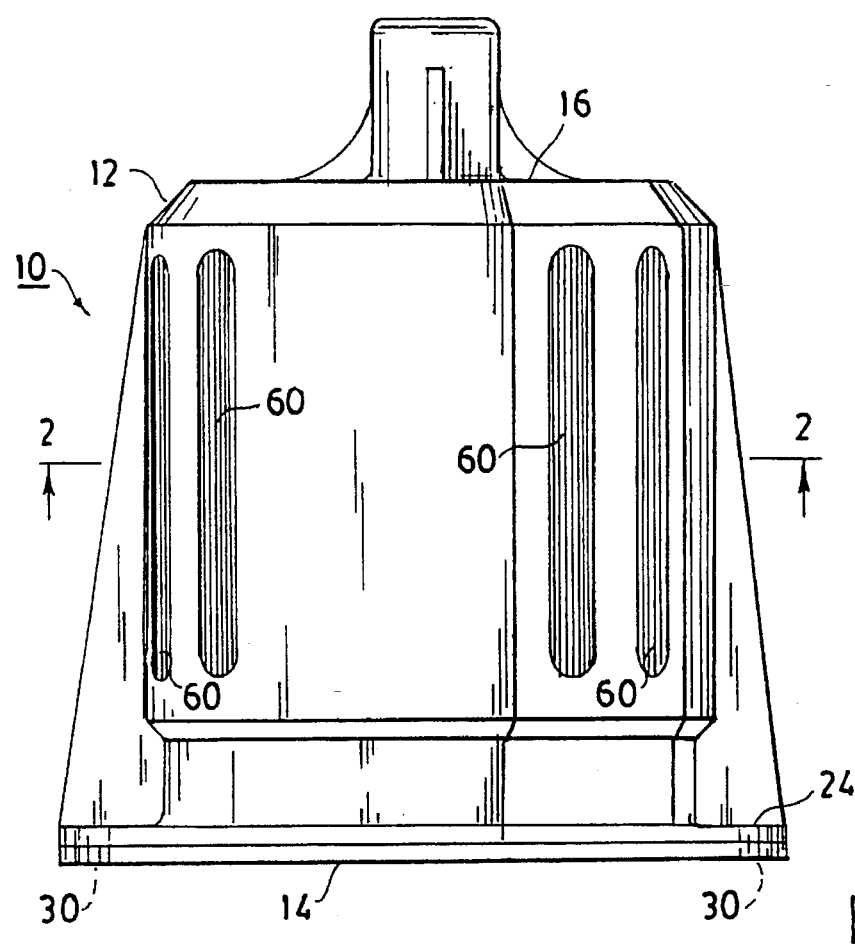
FIG. 1 is a side view of my new motor housing assembly.
Figure 2:
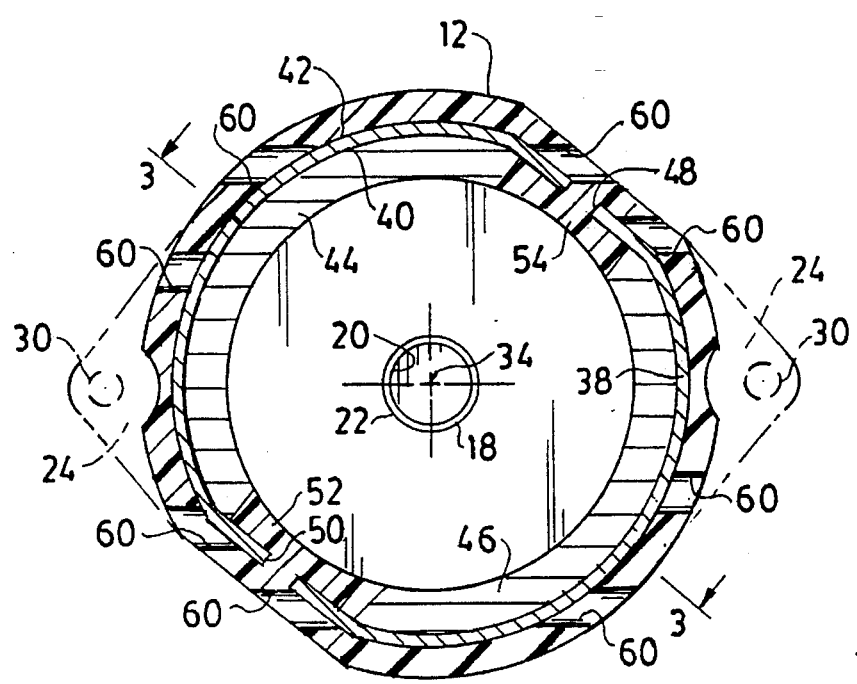
FIG. 2 is a cross-sectional end view of the same assembly along line 2—2 of FIG. 1 also showing flange portions in phantom line.
Figure 3:
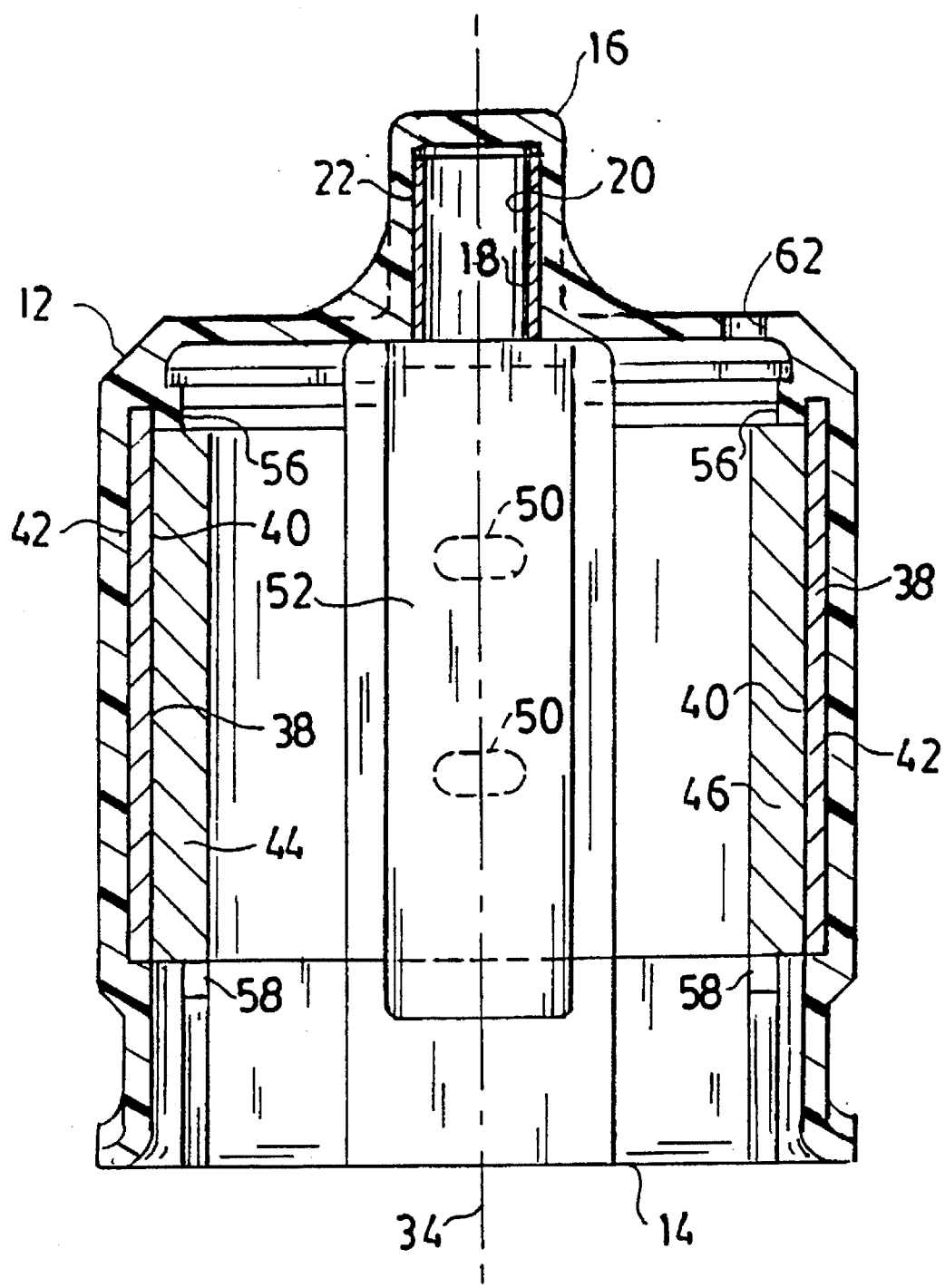
FIG. 3 is a cross-sectional view of the assembly taken along line 3—3 of FIG. 2.

A windshield wiper motor housing assembly 10 is illustrated in FIGS. 1 through 3 as a preferred embodiment of my invention. The assembly 10 includes a cup-shaped housing 12 having an open end 14 and a closed end 16. The housing 12 is molded of a resin material such as AMODEL A-1565 HS NT from Amoco Performance Products, Inc. of Atlanta, Ga. The preferred resin is a sixty-five percent glass and mineral reinforced polyphthalamide that exhibits high stiffness and good dimensional stability at elevated temperatures.

An armature bearing 18 in the form of a thin sleeve having inner and outer cylindrical surfaces 20 and 22 is molded in place within the closed end 16 of the housing. The armature bearing 18 is also preferably made of a resin material such as TORLON 4203L from the same manufacturer. The preferred resin material of the armature bearing 18 is a polyamide-imide that exhibits high strength and wear resistance at elevated temperatures, low friction, and a higher melting point than the resin material of the housing 12 to permit the armature bearing to be molded in place within the housing. Alternatively, a sintered steel-bronze spherical bearing could be molded in place within the housing to provide limited angular adjustment.

Figure 4:
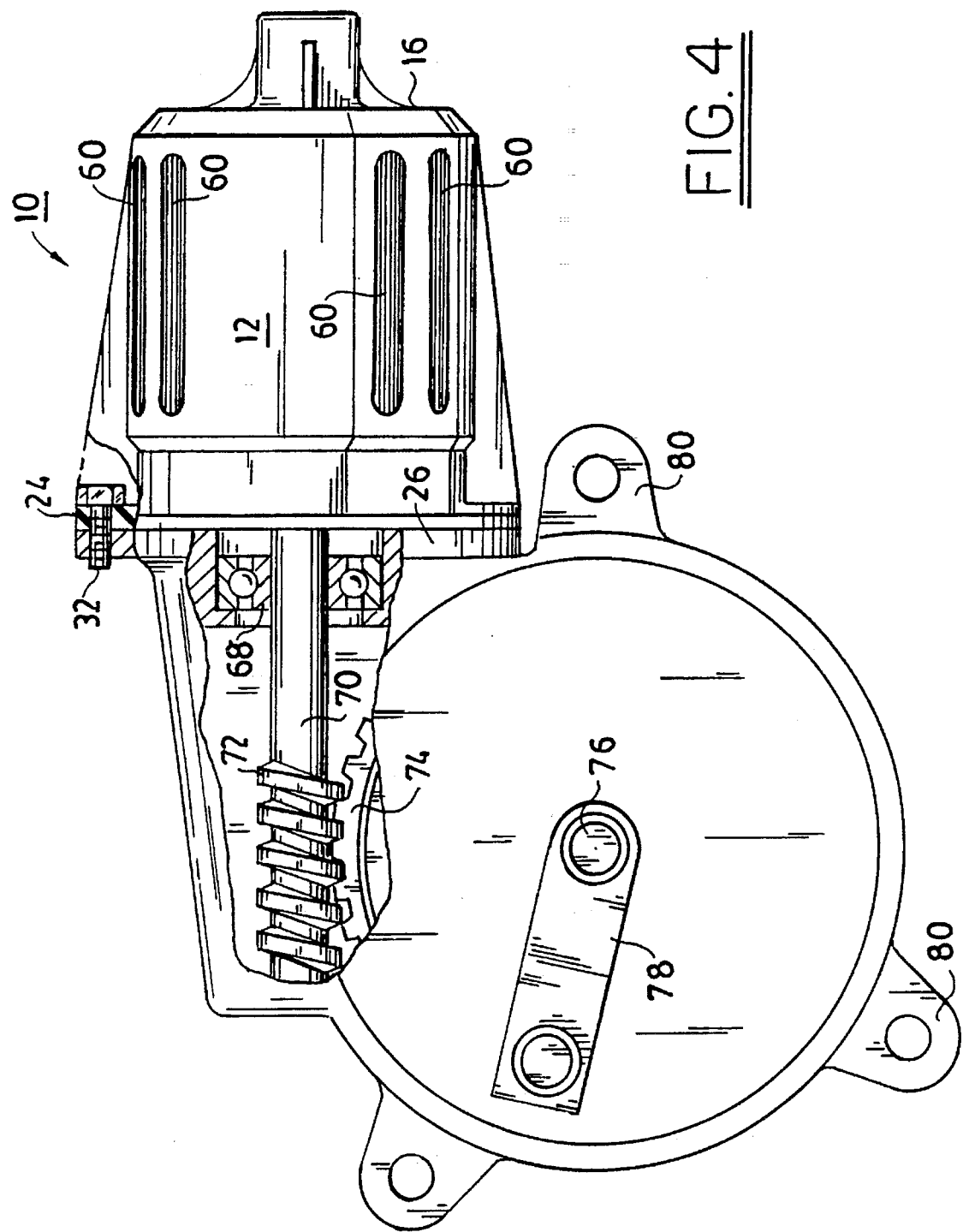
FIG. 4 is a partly cut-away view of the assembly attached to a windshield wiper drive casting.

A flange 24 is molded at the open end 14 of the housing for mounting the housing assembly 10 on a cover portion 26 of a wiper drive casting 28 shown in FIG. 4. Mounting holes 30 are formed through the flange 24 for aligning the housing assembly 10 with similar mounting holes formed in the cover portion 26. Fasteners 32 in the form of screws or rivets extend through the mounting holes in the flange 24 and cover portion 26 for attaching the housing assembly 10 to the wiper drive casting 28.

Both the mounting holes 30 and the inner cylindrical surface 20 of the armature bearing are molded within the housing 12 in positions that are centered with respect to a central axis 34. This eliminates the need for angularly adjusting the armature bearing into alignment with the central axis.

A steel flux ring 38 also having inner and outer cylindrical surfaces 40 and 42 is mounted in place within the housing 12. Preferably, the flux ring 38 is molded in place in a position that also centers the inner cylindrical surface 40 of the flux ring with respect to the central axis 34. The inner cylindrical surface 40 of the flux ring provides a mounting surface for locating a pair of permanent magnets 44 and 46 within the housing 12. Since the inner cylindrical surfaces 20 and 40 of the armature bearing and flux ring can be mounted independent of any diametral variations of their respective outer cylindrical surfaces 22 and 42, a gap between an armature coil (not shown) and the permanent magnets 44 and 46 can be reduced for improving motor performance.

Two pairs 48 and 50 of oblong apertures are formed through the flux ring 38 in orientations that minimize disruption of magnet flux. Respective protrusions 52 and 54 are molded through the aperture pairs 48 and 50 for holding the magnets 44 and 46 in place against the flux ring 38. The magnets 44 and 46 can be inserted between the protrusions 52 and 54 through the open end 14 of the housing.

The protrusions 52 and 54 are shaped to grip opposite sides of the magnets 44 and 46 similar to dovetail fasteners for press fitting the magnets against the flux ring 38. Molded stop lands 56 hold the magnets 44 and 46 in place against movement toward the closed end 16 of the housing. The flux ring 38 is also made with tabs 58 that can be folded against ends of the magnets 44 and 46 for preventing movement of the magnets toward the open end 14 of the housing. Alternatively, the protrusions could be formed with tapers to secure the magnets against such movement with an interference fit.

Openings 60 are formed through an exterior surface of the housing 12 for exposing the outer cylindrical surface 22 of the flux ring to atmosphere. Any excess heat retained in the flux ring is dissipated to the atmosphere through the openings 60. A vent 62 permits air circulation between an interior of the housing 12 and the atmosphere.

The motor housing assembly 10 of FIGS. 1 through 3 is connected in FIG. 4 to the wiper drive casting 28. A second armature bearing 68 is mounted in the casting 28 for rotatively supporting an armature shaft 70 that extends through the cover portion 26. The two armature bearings 18 and 68 are aligned with each other and the central axis 34 by the fasteners 32. A worm gear 72 is fashioned at the end of the armature shaft 70 for driving a worm wheel 74. A shaft 76 driven by the worm wheel 74 rotates a crank arm 78 of a wiper linkage mechanism (not shown). Brackets 80 mount the wiper drive casting 28 in a vehicle.

Figure 5:
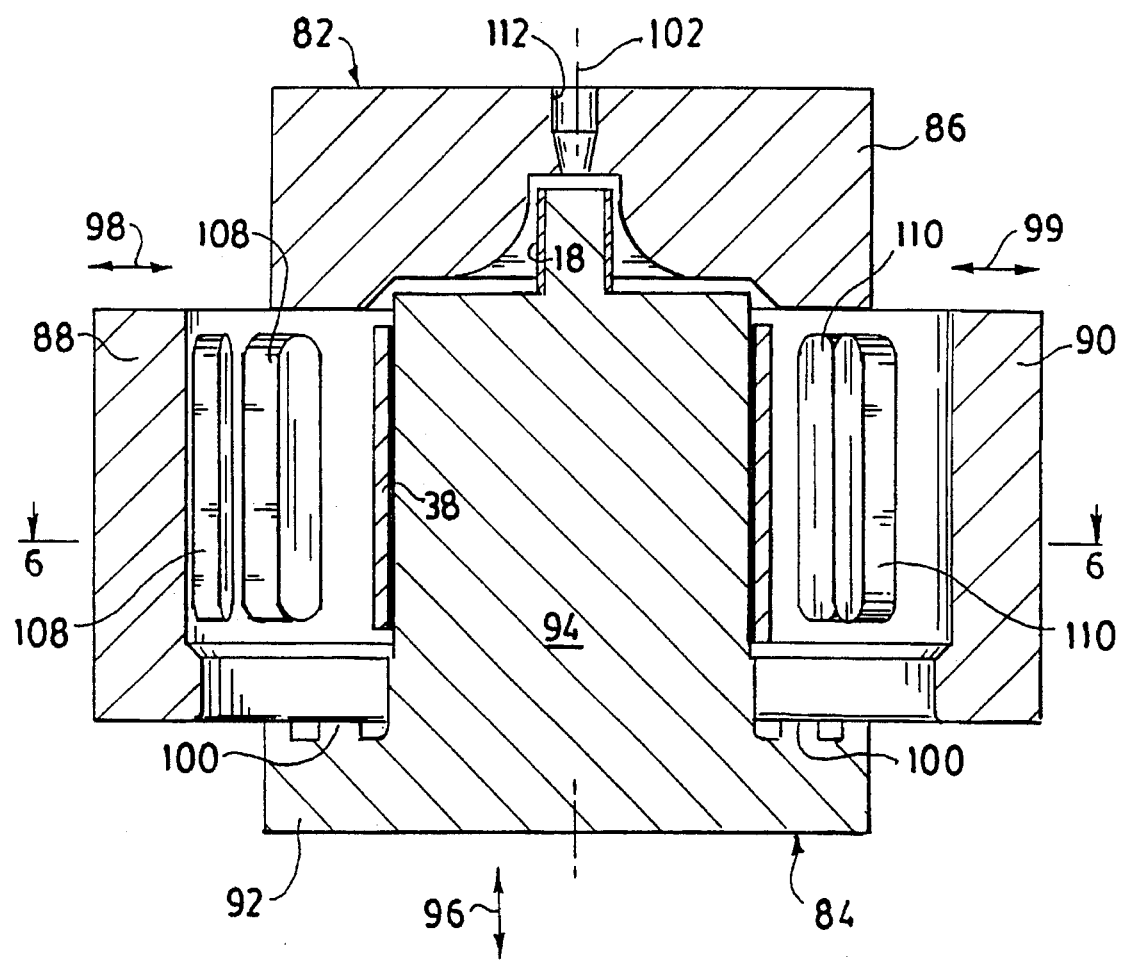
FIG. 5 is a simplified cross-sectional side view through an injection mold for making the assembly.
Figure 6:
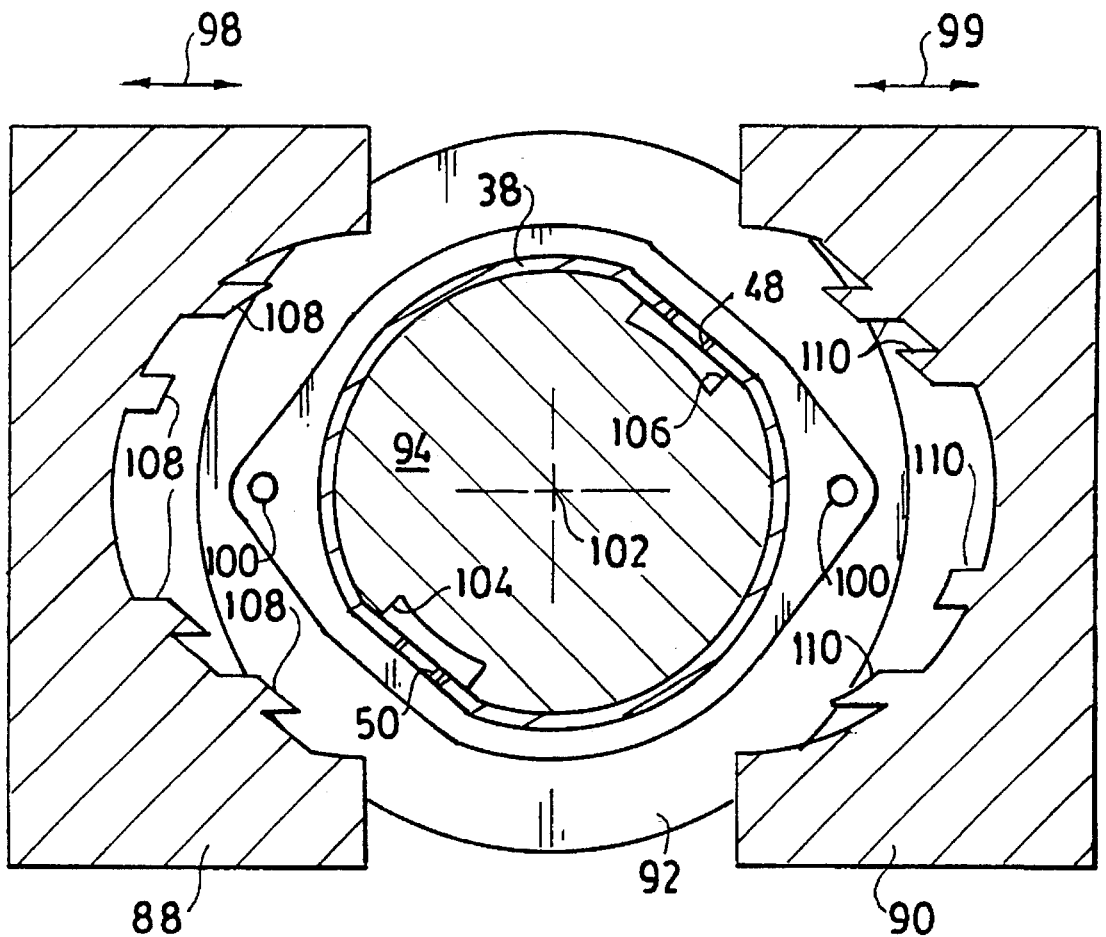
FIG. 6 is a cross-sectional end view of the injection mold along line 6—6 of FIG. 5.

The housing 12 is preferably injection molded within a mold cavity formed by mold parts such as those shown in FIGS. 5 and 6. The mold includes top and bottom halves 82 and 84. The top half 82 includes a machined portion 86 that forms the closed end 16 of the housing and two slide portions 88 and 90 that form the housing periphery. The bottom half 84 of the mold includes a machined portion 92 that forms the open end 14 of the housing and a core portion 94 that forms the housing interior.

The top and bottom mold halves 82 and 84 are relatively movable in the directions indicated by arrow 96, and the two slide portions 88 and 90 are relatively movable in the directions indicated by arrows 98 and 99 for exposing the core portion 94. The armature bearing 18 is mounted on a small diameter section of the core portion 94, and the flux ring 38 is mounted on a concentric large diameter section of the core portion 94. The machined portion 92 of the bottom mold half includes posts 100 for forming the mounting holes 30 in positions that are centered with respect to a central axis 102, which is also the central axis of the core portion 94. Accordingly, the inner cylindrical surfaces 20 and 40 of the armature bearing and flux ring, as well as the mounting holes 30 of the flange, are centered with respect to each other within the bottom mold half 84.

Recesses 104 and 106 in the core portion 94 form the protrusions 52 and 54. Aperture pairs 48 and 50 permit resin to flow through the flux ring 38 into the recesses 104 and 106 for forming the protrusions 52 and 54. Projections 108 and 110 on the slide portions 88 and 90 form the openings 60 in the housing for exposing portions of the flux ring to atmosphere.

Two additional functions are also performed by the projections 108 and 110 during the molding process. First, the projections 108 and 110 hold the flux ring 38 against the core portion 94 for forming a stop that prevents flow of resin material between the flux ring 38 and the core portion 94. Second, the projections 108 and 110 squeeze the flux ring 38 against the core portion in a secondary forming operation, similar to coining, for conforming the inner cylindrical surface 40 of the flux ring to the core portion 94.

The projections 108 and 110 are also grouped in pairs to contact the flux ring 38 in positions for accurately locating the magnets 44 and 46. In other words, each of the magnets is located by two portions of the flux ring that are formed to final accuracy during the molding operation.

A sprue 112 in the machined portion 86 of the top mold half provides an opening for injecting fiber-filled resin material into the mold. The sprue is aligned with an end of the core portion 94 to introduce turbulence within the resin for better distributing the fibers throughout the mold. After the resin has sufficiently cooled, the slide portions 88 and 90 are opened and the top and bottom mold halves 82 and 84 are separated for removing the molded housing assembly 10 from the core portion 94.

Although my invention has been described for use in a windshield wiper motor, my invention can also be used to provide an improved motor housing assembly for other automotive systems as well as other types of systems that are adaptable for similar improvements.

The original disclosure of parent application U.S. Ser. No. 942,434, filed 9 Sep. 1992, is hereby incorporated by reference.

I claim:

1. A method of making an electric motor housing having an open end for receiving a cover comprising the steps of:

mounting a flux ring having an inner cylindrical surface on one portion of a mold core part;

closing a mold cavity part about the flux ring;

injection molding a housing between the mold parts including molding alignment elements at the open end of the housing for positioning the cover;

opening the mold cavity part;

removing the core mold part leaving the inner cylindrical surface of the flux ring centered in the housing with respect to the alignment elements at the open end of the housing;

said step of injection molding including molding protrusions through openings in the flux ring for holding magnets in place within the housing; and press fitting the magnets in place against the flux ring.

2. The method of claim 1 in which said protrusions are molded as fasteners for press fitting the magnets in place against the flux ring.

3. The method of claim 2 in which said step of injection molding includes injecting a fiber-filled resin material between the mold parts.

4. The method of claim 3 including the additional step of aligning the mold core part with a sprue in the mold cavity part to introduce turbulence within the fiber-filled resin material during said step of injection molding.

5. The method of claim 1 including the additional step of folding tabs formed at one end of the flux ring against the magnets for holding the magnets in place against movement toward the open end of the housing.

6. The method of claim 1 including the further step of mounting a bearing having an inner cylindrical surface on another portion of the mold core part.

7. The method of claim 6 in which said step of closing the mold cavity part includes closing the mold cavity part about the bearing and said step of removing the core mold part includes leaving the inner cylindrical surface of the bearing centered in the housing with respect to the alignment elements.

8. A method of making an electric motor housing having an open end for receiving a cover comprising the steps of:

mounting a flux ring having an inner cylindrical surface on one portion of a mold core part;

closing a mold cavity part about the flux ring;

injection molding a housing between the mold parts including molding alignment elements at the open end of the housing for positioning the cover;

opening the mold cavity part; and removing the core mold part leaving the inner cylindrical surface of the flux ring centered in the housing with respect to the alignment elements at the open end of the housing, wherein said step of injection molding includes molding openings in the housing for exposing the flux ring within an exterior surface of the housing.

9. The method of claim 8 in which said step of injection molding includes molding a flange at the open end of the housing and molding the alignment elements as holes extending through the flange.

10. The method of claim 8 including the further step of mounting a bearing having an inner cylindrical surface on another portion of the mold core part.

11. The method of claim 10 in which said step of closing the mold cavity part includes closing the mold cavity part about the bearing and said step of removing the core mold part includes leaving the inner cylindrical surface of the bearing centered in the housing with respect to the alignment elements.

12. A method of making an electric motor housing comprising the steps of:

mounting a flux ring on a mold core part;

closing a mold cavity part around the flux ring;

compressing portions of the flux ring between the mold core part and projections of the mold cavity part for imparting a final shape to the flux ring;

injection molding a housing within the mold cavity part;

opening the mold cavity part leaving windows formed in the housing for exposing the compressed portions of the flux ring; and removing the mold core part leaving the flux ring mounted within the housing.

13. The method of claim 12 including the step of mounting magnets against the compressed portions of the flux ring.

14. The method of claim 13 in which said compressing step includes arranging the projections in pairs so that each of the magnets is mounted against two of the compressed portions of the flux ring.

15. The method of claim 13 in which said flux ring is compressed against the mold core part to prevent the flow of molding material between portions of the flux ring and the mold core part.

16. The method of claim 15 in which said step of injection molding includes molding protrusions through openings in the flux ring for securing the flux ring to the housing and for holding the magnets in place against the flux ring.

* * * * *